United States Patent

Tanoi

Patent Number: 5,929,898
Date of Patent: Jul. 27, 1999

[54] MULTI-POINT CONTROL UNIT FOR USE IN MULTI-POINT VIDEOCONFERENCE SYSTEM CAPABLE OF SUPPRESSING DETERIORATION OF PICTURE QUALITY ON SPLIT SCREEN

[75] Inventor: Toshiyuki Tanoi, Tokyo, Japan

[73] Assignee: NEC Corporation, Tokyo, Japan

[21] Appl. No.: 09/004,922

[22] Filed: Jan. 9, 1998

[30] Foreign Application Priority Data

Jan. 9, 1997 [JP] Japan ................................. 9-001997

[51] Int. Cl.⁶ .................................................. H04N 7/14
[52] U.S. Cl. ................................ 348/15; 348/14; 348/17
[58] Field of Search .................................. 348/14, 15, 16, 348/17, 405

[56] References Cited

U.S. PATENT DOCUMENTS

| | | |
|---|---|---|
| 4,650,929 | 3/1987 | Boerger et al. . |
| 4,802,006 | 1/1989 | Iinuma et al. . |
| 4,961,211 | 10/1990 | Tsugane et al. . |
| 4,995,071 | 2/1991 | Weber et al. . |
| 5,003,532 | 3/1991 | Ashida et al. . |
| 5,265,052 | 6/1996 | Ar ........................................... 348/405 |
| 5,589,884 | 12/1996 | Ohguchi ................................. 348/405 |
| 5,638,114 | 6/1997 | Hatanaka et al. ......................... 348/14 |
| 5,684,527 | 11/1997 | Terui et al. ............................... 348/15 |

FOREIGN PATENT DOCUMENTS

| | | |
|---|---|---|
| 2-58486 | 2/1990 | Japan . |
| 2-105791 | 4/1990 | Japan . |
| 3-10464 | 1/1991 | Japan . |
| 3-6190 | 1/1991 | Japan . |
| 4-176290 | 6/1992 | Japan . |
| 6-169452 | 6/1994 | Japan . |

*Primary Examiner*—Curtis A. Kuntz
*Assistant Examiner*—Melur Ramakrishnaiah
*Attorney, Agent, or Firm*—Sughrue, Mion, Zinn, Macpeak & Seas, PLLC

[57] ABSTRACT

In a multi-point control unit for use in a multi-point videoconference system, an encoding controller is connected to first through N-th decoders and an encoder to produce a controlling signal in response to first through N-th decoding information signals supplied from the first through the N-th decoders and to supply the controlling signal to the encoder. The encoder is connected to a picture combining section to encode a combined signal supplied from the picture combining section into a combined picture data signal so that each of divisional picture signals included in the combined signal is encoded by the use of individual quantizing characteristic controlled by the controlling signal. A data exchanger is connected to the encoder to transmit the combined picture data signal to the first through the N-th videoconference terminals through a network. The first through the N-th decoders are connected to the data exchanger and decodes first through N-th terminal picture data signals sent from the first through the N-th videoconference terminals through the network, respectively, to produce first through N-th decoded signals and the first through the N-th decoding information signals and reduces the first through the N-th decoded signals to produce first through N-th divisional picture signals. A picture combining section is connected to the first through the N-th decoders to select M from the first through the N-th divisional picture signals and to produce the combined signal.

12 Claims, 5 Drawing Sheets

MULTI-POINT CONTROL UNIT FOR USE IN MULTI-POINT VIDEOCONFERENCE SYSTEM CAPABLE OF SUPPRESSING DETERIORATION OF PICTURE QUALITY ON SPLIT SCREEN

BACKGROUND OF THE INVENTION

This invention relates to a multi-point control unit for use in a multi-point videoconference system which has a plurality of videoconference terminals.

As is well known in the art, a multi-point videoconference system is used for holding a videoconference among participants who are in a plurality of places spaced one another. The multi-point videoconference system includes a plurality of videoconference terminals which are individually located in the places and which are connected to one another, for example, through a network. Each of the participants participates in the videoconference through one of the videoconference terminals.

A type of the multi-point videoconference system has a multi-point control unit which is connected to the videoconference terminals through a network. The multi-point control unit receives terminal picture data signals from the videoconference terminals through the network and provides a combined picture data signal that the terminal picture data signals are combined with one another to each of the videoconference terminals through the network. Each of the videoconference terminals displays a combined picture including a plurality of divisional pictures by the use of a split screen technique in response to the combined picture data signal.

A conventional multi-point control unit has a data exchanging unit which is connected to a network to transmit/receive data signals to/from a plurality of videoconference terminals. A plurality of decoders individually corresponding to the videoconference terminals is connected to the data exchanging unit and decodes terminal picture data signals sent from the videoconference terminals to produce decoded terminal picture signals. Furthermore, the decoders thin out parts of the decoded terminal picture signals to produce divisional picture signals. A picture combining unit is connected to the decoders and combines the divisional picture signals to produce a combined picture signal. An encoder is connected between the picture combining unit and the data exchanging unit and encodes the combined picture signal so that each divisional picture signal included in the combined picture signal is encoded by the use of individual quantizing characteristic. The encoder supplies an encoded combined picture data signal to the videoconference terminals through the data exchanging unit and the network.

As mentioned above, the conventional multi-point control unit must carry out both of decoding and encoding to produce the combined picture data signal. This causes large deterioration of quality of the combined picture displayed on each of the videoconference terminals. Particularly, when one of the divisional pictures becomes large about coding data, another divisional picture having small coding data deteriorates in quality.

Such a problem is already indicated in Japanese Unexamined Patent Publications Nos. 2-58486 and 3-6190. Though these Publications teach means of solving the problem, the means require changing the videoconference system in whole.

Besides, similar multi-point control unit is disclosed in U.S. Pat. No. 4,650,929 issued to Boerger et al. However, nothing is mentioned about decoding and encoding in this disclosure.

In addition, various encoders and decoders are disclosed in Japanese Unexamined Patent Publications Nos. 2-105791, 3-10464, 4-176290 and 6-169452. However, though these encoders and decoders change quantizing step for each block of picture elements, they can not handle divisional pictures.

SUMMARY OF THE INVENTION

It is therefore an object of this invention to provide a multi-point control unit capable of suppressing deterioration of a picture quality.

It is another object of this invention to provide a method of encoding a combined picture signal capable of suppressing deterioration of a picture quality.

Other objects of this invention will become clear as the description proceeds.

In order to understand the gist of this invention, it should be noted that a multi-point control unit is used in a multi-point videoconference system which has first through N-th ($N \geq 3$, N: integer) videoconference terminals connected to a network. The first through the N-th videoconference terminals transmits first through N-th terminal picture data signals to the multi-point control unit, respectively, and receives a combined picture data signal supplied from the multi-point control unit. Each of the first through the N-th terminal picture data signals provides a predetermined picture size.

According to an aspect of this invention, the multi-point control unit comprises a data exchanger which is connected to the network to receive the first through the N-th terminal picture data signals through the network and to transmit the combined picture data signal to the first through the N-th videoconference terminals through the network. First through N-th decoders are connected to the data exchanger to decode the first through the N-th terminal picture data signals, respectively, and to produce both first through N-th decoded signals and first through N-th decoding information signals. The first through the N-th decoders thin out parts from the first through the N-th decoded signals, respectively, to produce first through N-th divisional picture signals each of which provides $1/M$ ($2 \leq M \leq N$, M: integer) of the predetermined picture size. A picture combining section is connected to the first through the N-th decoders to select M from the first through the N-th divisional picture signals and to produce a combined signal including the M of the divisional picture signals. An encoder is connected to the picture combining section to encode the combined signal and to produce the combined picture data signal so that each of divisional picture signals included in the combined signal is encoded by the use of individual quantizing characteristic. An encoding controller is connected to the first through the N-th decoder and the encoder to produce a controlling signal in response to the first through the N-th decoding information signals and supplies the controlling signal to the encoder to control the individual quantizing characteristic.

Moreover, it should be noted that a method of encoding a combined picture signal includes M ($M \geq 2$, M: integer) selected from first through N-th ($N \geq M$, N: integer) divisional picture signals.

According to another aspect of this invention, the method comprises the steps of receiving first through N-th terminal picture data signals to produce first through N-th received signals, individually decoding the first through the N-th received signals to produce both first through N-th decoded signals and first through N-th decoding information signals, individually thinning out parts from the first through N-th decoded signals to produce first through N-th divisional picture signals, selecting M from the first through the N-th divisional picture signals to produce selected picture signals, combining the M of selected picture signals to produce the combined picture signal, classifying the first through the N-th divisional picture signals into predetermined classes in response to the first through N-th decoding information signals, respectively, and encoding the combined picture signal so that each of divisional picture signals included in the combined picture signal is encoded by the use of individual quantizing characteristic with referring to predetermined classes.

DESCRIPTION OF THE PREFERRED EMBODIMENT

Figure 1:
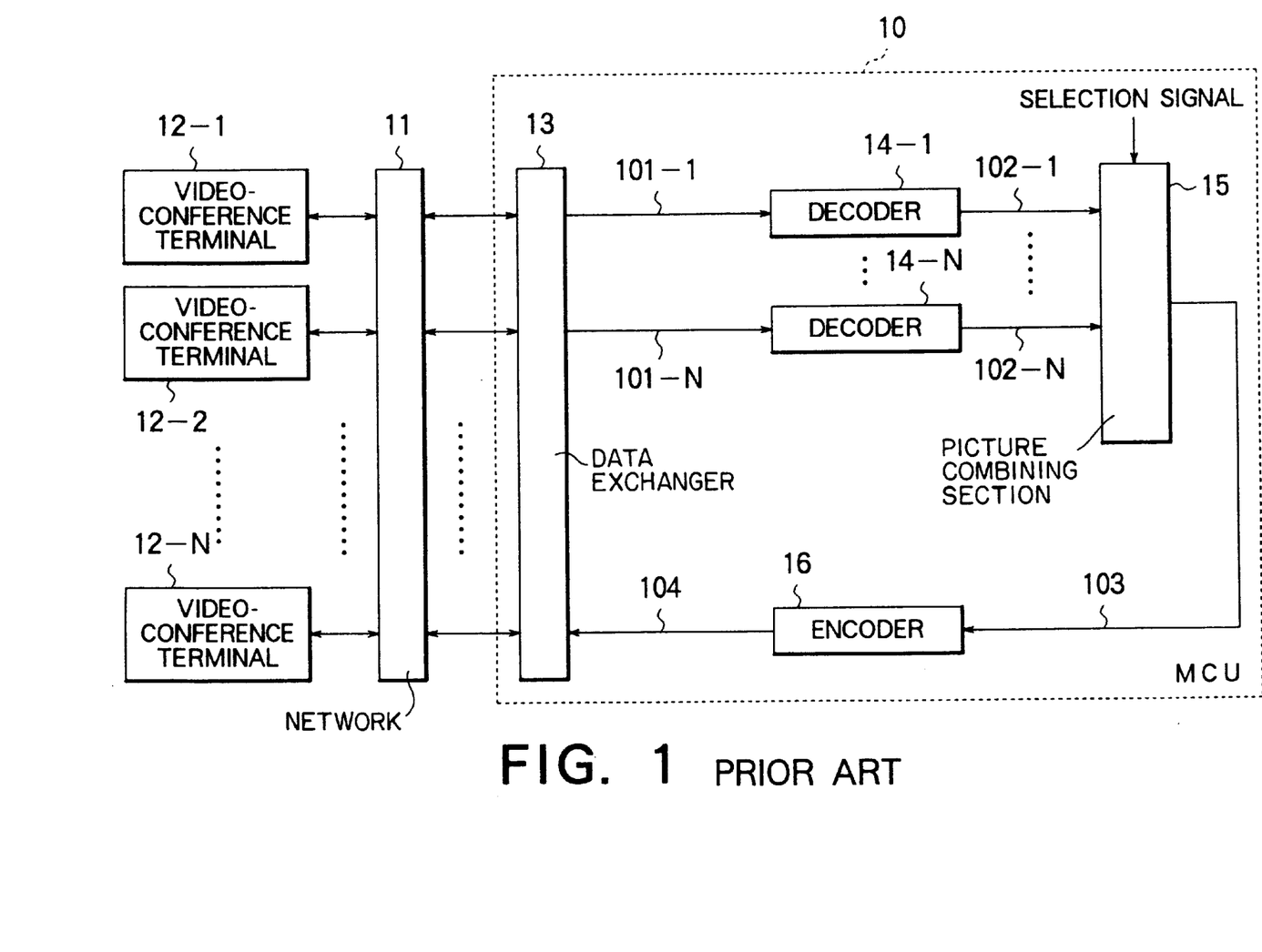
FIG. 1 is a block diagram of a conventional multi-point control unit.

Referring to FIG. 1, description will be at first directed to a conventional multi-point control unit for a better understanding of this invention.

The conventional multi-point control unit (MCU) 10 is connected to a network 11 which is connected to first through N-th ($3 \leq N$, N: integer) videoconference terminals 12-1, 12-2, . . . and 12-N.

Each of the videoconference terminals 12-1, 12-2, . . . , and 12-N may be conformed to a recommendation of ITU-T H.320 and adopts encoding method and decoding method that may be conformed to a recommendation of ITU-T H.261. A signal processing unit disclosed in U.S. Pat. No. 4,802,006 may be used in the videoconference terminals 12-1, 12-2, . . . , and 12-N.

Each videoconference terminal 12 has an image pick up equipment (not shown) to pick up an object, for example, a participant participating to a videoconference, to produce a terminal picture signal. Moreover, the videoconference terminal 12 has an encoder (not shown) to encode (and compress) the terminal picture signal into a terminal picture data signal. Therefore, the videoconference terminals 12-1, 12-2, . . . , and 12-N transmit first through N-th terminal picture data signals, respectively, to the multi-point control unit 10 through the network 11.

In addition, each videoconference terminal 12 receives a combined picture data signal sent from the multi-point control unit 10 through the network 11. The videoconference terminal 12 has a decoder (not shown) to decode the combined picture data signal into a received picture signal. The videoconference terminal 12 has a display (not shown) to display a picture in response to the received picture signal.

The multi-point control unit 10 has a data exchanger 13 which is connected to the network 11 to receive the first through the N-th terminal picture data signals from the network 11 and to transmit the combined picture data signal to the network 11.

First through N-th decoders 14-1, . . . , and 14-N are connected to the data exchanger 13 to receive the first through the N-th terminal picture data signals, respectively. In other words, the data exchanger 13 supplies the first through the N-th terminal picture data signals 101-1, . . . , and 101-N to the first through the N-th decoders 14-1, . . . , and 14-N, respectively.

Each decoder 14 corresponds to the encoding method of the videoconference terminal 12. For example, the decoder 14 adopts the decoding method conformed to a recommendation of ITU-T H.261. The first through the N-th decoders 14-1, . . . , and 14-N decode the first through the N-th terminal picture data signals 101-1, . . . , and 101-N into first through N-th decoded picture signals, respectively. Furthermore, the first through the N-th decoders 14-1, . . . , and 14-N reduce the first through the N-th decoded picture signals to produce first through N-th divisional picture signals 102-1, . . . , and 102-N, respectively. Each of the first through the N-th divisional picture signals 102-1, . . . , and 102-N represents a picture having 1/m of an original picture in size. This reduction (or thinning out) of the divisional picture signals 102 is carried out so as to remove periodically picture elements from the original picture along both horizontal and vertical directions.

A picture combining section 15 is connected to the first through the N-th decoders 14-1, . . . , and 14-N. The picture combining unit 15 selects M (N>M$\geq$2, M: integer) from the first through the N-th divisional picture signals 102-1, . . . and 102-N in response to a selection signal supplied from the outside. For example, the selection signal is supplied from a system controller (not shown) connected to the multi-point control unit 10, an input unit (not shown) connected to the multi-point control unit 10, or any of the videoconference terminals 12. The system controller may adopt an automatic selection technique using voice detection. Such an automatic selection technique is disclosed in U.S. Pat. No. 4,961,211. A selection technique by the videoconference terminals 12 is disclosed, for example, in U.S. Pat. Nos. 4,961,211, 4,995, 071 and 5,003,532. The picture combining section 15 combines M of the divisional picture signals into a combined signal 103.

In case of M=N, the picture combining section 15 combines all of the divisional picture signals 102 into a combined signal 103.

A encoder 16 is connected to the picture combining section 15 and adopt a encoding method corresponding to the decoding method adopted by the videoconference terminals 12. The encoder encodes (and compresses) the combined signal 103 into the combined picture data signal 104. This encoding is carried out so that each of the divisional picture signals included in the combined signal 103 is encoded by the use of an individual coding parameter or individual quantizing characteristic.

The data exchanger 13 transmits the combined picture data signal 104 to all of the videoconference terminals 12 through the network 11.

Each of the videoconference terminals 12 simultaneously displays M of pictures on the display by the use of split screen technique in response to the combined picture data signal 104.

As mentioned above, the conventional multi-point control unit 10 individually decodes N of the terminal picture data signals and individually reduces the size of the pictures represented by the terminal picture data signals. Then, the multi-point control unit 10 selects M of the divisional picture signals to combine them and encodes the combined signal 103 to transmit it to N of the videoconference terminals 12. Therefore, the conventional multi-point control unit 10 can make the videoconference terminals 12 display the combined picture.

However, the multi-point control unit 10 has a defect that quality of the combined picture displayed on the display of each videoconference terminals is much deteriorated by a combination of the decoding and the encoding. Particularly, when one of the divisional pictures becomes large about coding data, another divisional picture having small coding data deteriorates in quality.

Referring to FIGS. 2 through 6, the description will proceed to a multi-point control unit according to a preferred embodiment of this invention. Similar parts are designated by like reference numerals.

Figure 2:
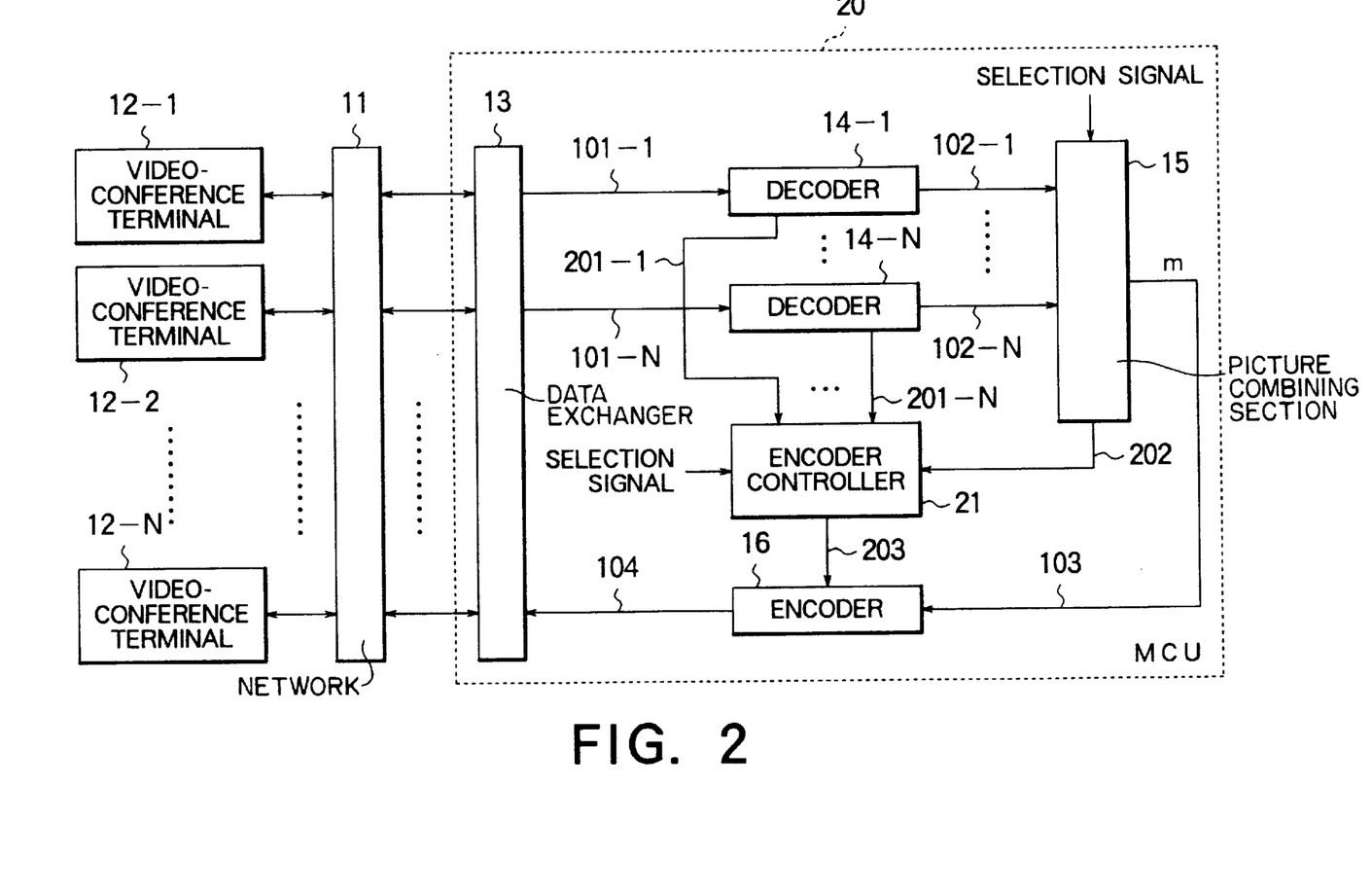
FIG. 2 is a block diagram according to a preferred embodiment of this invention.

In FIG. 2, the multi-point control unit 20 has an encoder controller 21 which is connected to the first through the N-the decoders 14-1, . . . and 14-N, the picture combining section 15 and the encoder 16. It should be noted that the decoders 14, the picture combining section 15 and the encoder 16 perform different operations as follows.

The first through the N-th decoders 14-1, . . . , and 14-N receive the first through N-th terminal picture data signals 101-1, . . . , and 101-N supplied from the data exchanger 13, respectively. The first through the N-th terminal picture data signals 101-1, . . . , and 101-N include first through N-th predetermined signals, respectively. Namely, the first through the N-th predetermined signals are multiplexed in the first through the N-th terminal picture data signals 101-1, . . . , and 101-N, respectively. The predetermined signals are, for example, invalid block signals, moving vector signals, flame thinning out signals, etc. and are supplied to the encoder controller 21 as decoding information signals 201. Namely, the first through the N-th decoders 14-1, . . . , and 14-N supplies first through N-th decoding information signals 201-1, . . . , and 201-N to the encoder controller 21, respectively.

The picture combining section 15 produce a timing signal 202 which is synchronous with a frame of the combined signal 103 and which provides an operation timing of the encoder controller 21.

The encoder controller 21 receives the same selection signal as the picture combining section 15 receives and selects M from the decoding information signals 201. The selected decoding information signals 201 correspond to M of the divisional picture signals 102, respectively. The encoder controller 21 detects movement quantity of the object in each flame of each picture in response to the selected decoding information signals 201 and in synchronization with the timing signal 202. The movement quantity represents a degree of inconspicuousness of deterioration of picture quality. The encoder controller 21 produces an encoder control signal 203 which is representative of the degree of inconspicuousness of deterioration of picture quality in each frame of each picture. Namely, the encoder controller 21 classify the M of the divisional picture signals 102 into predetermined classes which correspond to the degree of inconspicuousness.

The encoder 16 encodes the combined signal 103 so that each of the selected divisional picture signals 102 is encoded by the use of an individual coding parameter. In this event, the individual coding parameter is adjusted on the basis of the encoding control signal 203 to prevent deterioration of the picture quality. Therefore, the encoder 16 encodes the combined signal 103 in accordance with the movement quantity of the object in each picture.

Herein, it is assumed that the decoding information signals 201 are the invalid block signals. Each of the invalid block signals indicates motionlessness of the object about corresponding a decoded block which is a basic unit of the terminal picture data signal. If the movement quantity of the object becomes small, the number of the invalid blocks increase. If the movement quantity of the object becomes large, the number of the invalid blocks decrease. In this case, the encoder controller 21 and the encoder 16 are formed as shown in FIG. 3.

Figure 3:
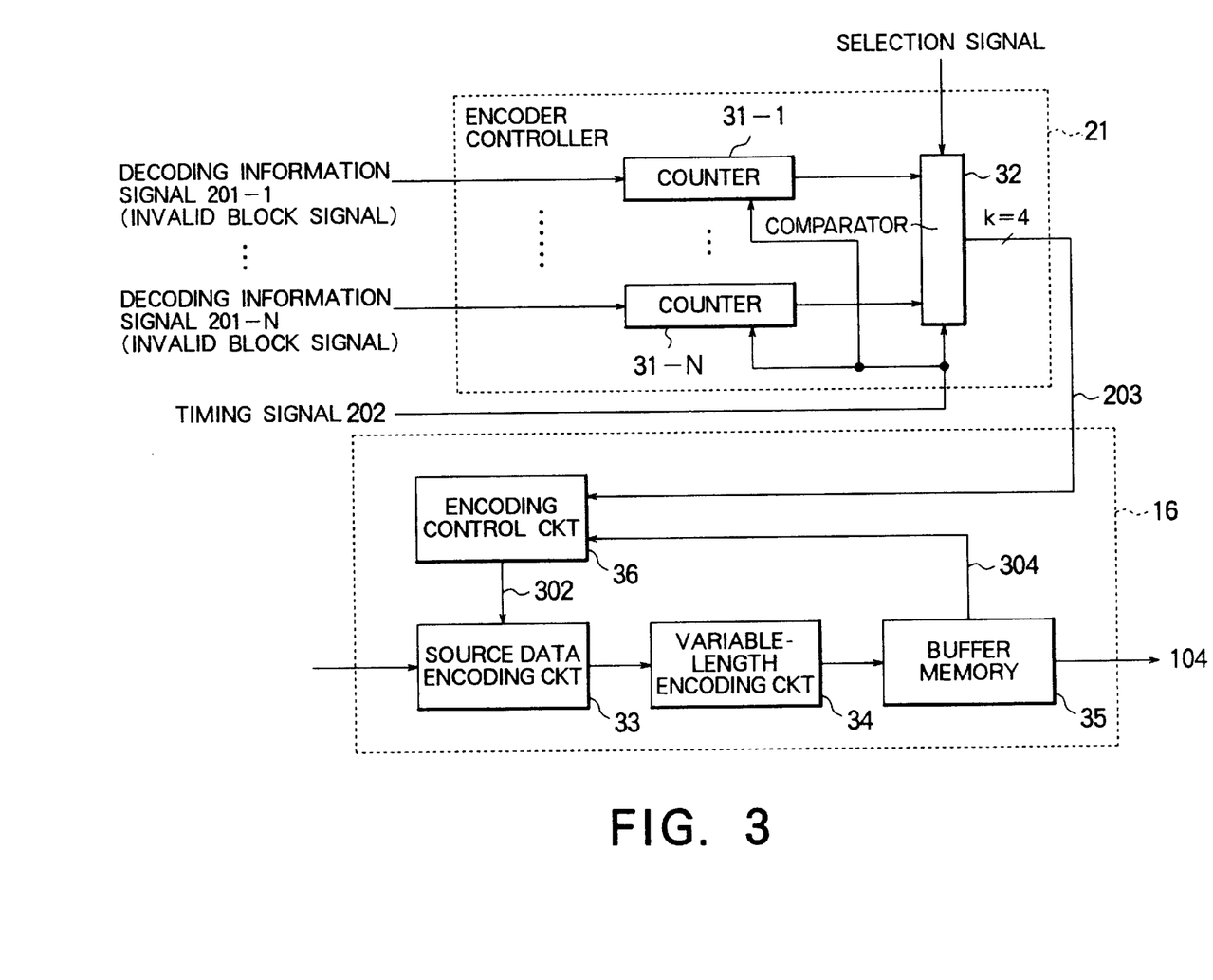
FIG. 3 is a block diagram of a combination of an encoding controller and a encoder illustrated in FIG. 2.

Referring to FIG. 3, the encoder controller 21 has first through N-th counters 31-1, . . . , and 31-N which are connected to the first through N-th decoders 14-1, . . . , and 14-N, respectively, and to the picture combining section 15. The first through the N-th counters 31-1, . . . , and 31-N count the first through the N-th invalid block signals 201-1, . . . , and 201-N, respectively, every period decided by the timing signal 202 and produce first through N-th counting values, respectively. A comparator 32 is connected to the first through the N-th counter 31-1, . . . , and 31-N and to the picture combining section 15. The comparator 32 is supplied with the selection signal to select M from the counting values sent from counters 31. The comparator 32 compares M of the counting values with one another to classify into predetermined classes which are representative of inconspicuousness of the deterioration of the picture quality.

Figure 4:
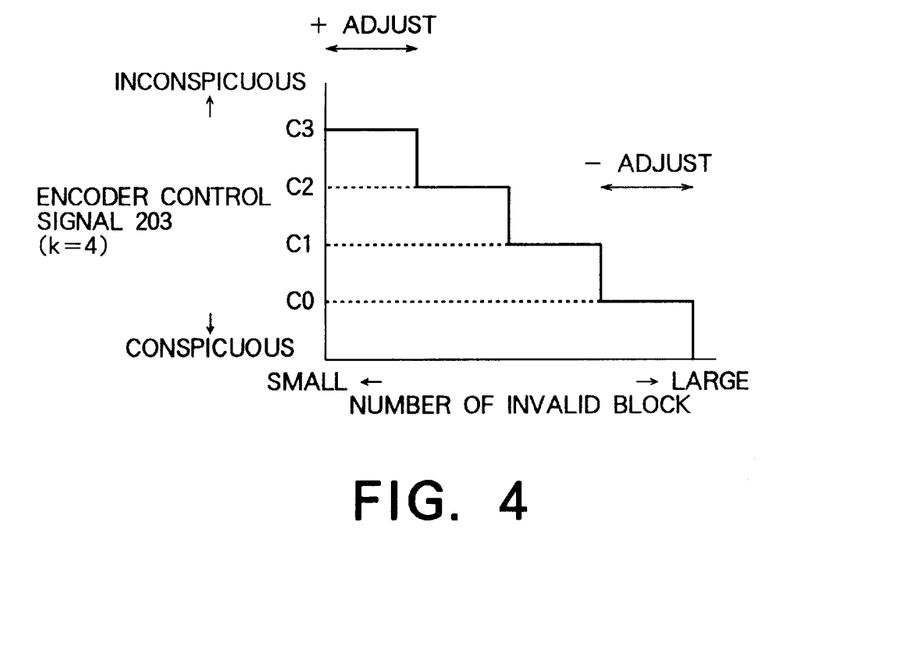
FIG. 4 shows a relation between the invalid block number and encoding signals.

For example, the predetermined classes (or steps) are fourth classes C0, C1, C2 and C3 as illustrated in FIG. 4. The classes C0, C1, C2 and C3 are representative of the inconspicuousness in this order. Namely, the class C3 is representative of the most inconspicuous class while the class C0 is representative of the most conspicuous class among the classes C0, C1, C2 and C3. In this case, the least counting value is preferentially classified into the class C3. This classifying is relatively carried out according to the counting values. The comparator 32 supplies the encoding control signal 203 which is representative of any classes C0, C1, C2 and C3.

Turning back to FIG. 3, the encoder 16 has a source data encoding circuit 33 which is connected to the picture combining section 15 and which encodes the combined signal 103 supplied from the picture combining section 15 into a first encoded signal 301 in response to a encoding parameter signal 302. A variable-length encoding circuit 34 is connected to the source data encoding circuit 33 to encode the first encoded signal into a variable-length code signal 303. A buffer memory 35 is connected to the variable-length encoding circuit 34 and the data exchanger 13 and memorizes the variable-length code signal 303 to send the variable-length code signal 303 as the combined picture data signal 104 to the data exchanger 13 at a predetermined rate. In addition, the buffer memory 35 produces an occupancy indicating signal 304 which is representative of quantity of the variable-length code signal 303 memorized in the buffer memory 35. An encoding control circuit 36 is connected to the comparator 32, the buffer memory 35 and the source data encoding circuit 33 to produce the encoding parameter signal 302 in response to the encoding control signal 203 and the occupancy indicating signal 304.

The encoding parameter signal 302 is representative of a encoding parameter, such as a quantizing step, a valid/invalid block threshold, flame thinning out direction, or a combination thereof. The encoding control circuit 36 basically operates in conformity with a recommendation of ITU-T H.261. Namely, the encoding control circuit 36 produces the encoding parameter so as to make the quantizing step coarse, make the valid/invalid block threshold big, or carry out the flame thinning out when the occupancy indicating signal 304 indicates that the quantity of the variable-length code signal 303 memorized in the buffer memory 35 becomes large. At any late, the encoding control circuit 36 produces the encoding parameter so as to make the source data encoding circuit 33 reduce information quantity of the first encoded signal 301 when the quantity of the variable-length code signal 303 memorized in the buffer memory 35 becomes large.

Figure 5:
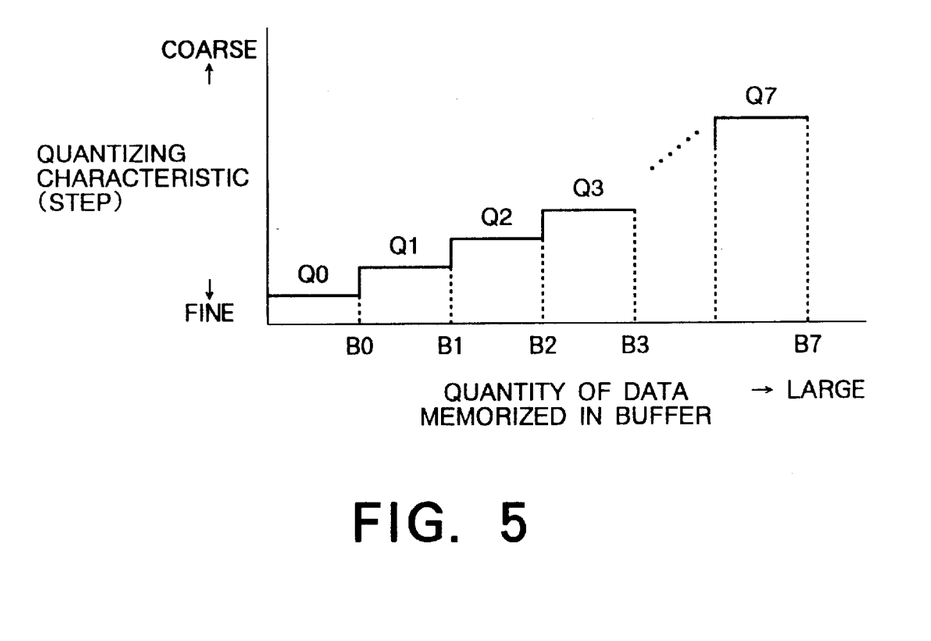
FIG. 5 shows a relation between quantity of combined picture data signal memorized in buffer memory and quantizing characteristic.

Furthermore, the encoding control circuit 36 adjusts the encoding parameter in response to the encoding control signal 203 to produce the encoding parameter signal 302. Herein, it is assumed that the encoding parameter is representative of the quantizing step. The quantizing step belongs to one of eight steps Q0, Q1, . . . , and Q7 which are classified in accordance with the quantity of the variable-length code signal 303 memorized in the buffer memory 35 as illustrated in FIG. 5. Namely, the steps Q0, Q1, . . . , and Q7 are according to the quantity B0, B1, . . . , and B7, respectively. The step Q7 is the coarsest and the step Q0 is the finest.

Figure 6:
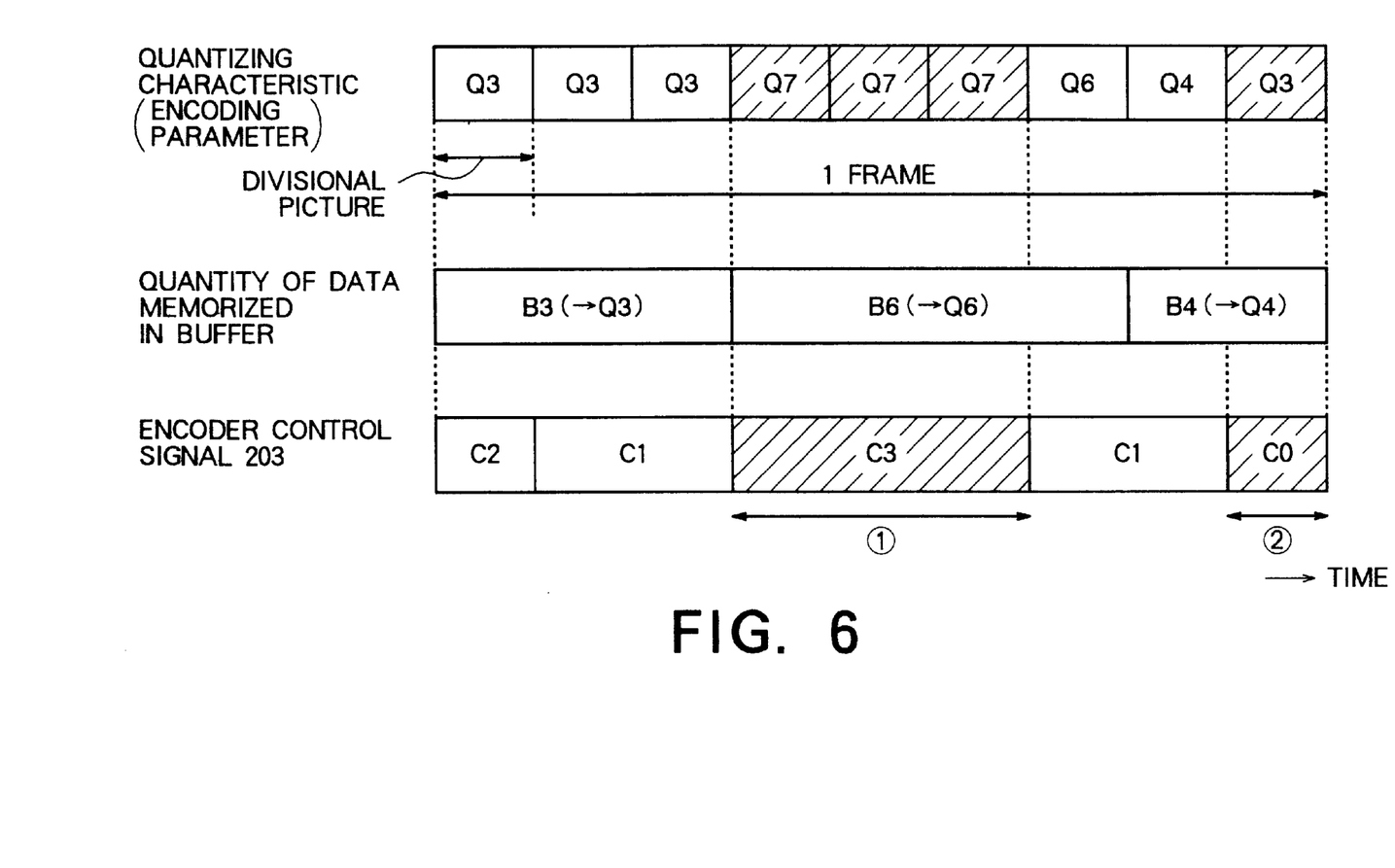
FIG. 6 is used for describing an operation of the encoding controller shown in FIG. 3.

If the quantity of the variable-length code signal 303 memorized in the buffer memory 35 changes from the quantity B3 to the quantity B4 through the quantity B6 as shown in FIG. 6, the encoding control circuit 36 recognizes that the encoding parameter changes from the step Q3 to the step Q4 through the step Q6. When the encoding control signal 203 is representative of the class C3 at a period ①, the encoding control circuit 36 makes the encoding parameter coarse by one step. In other words, the encoding control circuit 36 adjusts the encoding parameter so that plus adjustment is carried out. In FIG. 6, the step Q6 is changed into the step Q7 at the period ①. On the other hand, when the encoding control signal 203 is representative of the class C0 at a period ②, the encoding control circuit 36 makes the encoding parameter fine by one step. Namely, the encoding control circuit 36 adjusts the encoding parameter so that minus adjustment is carried out. In FIG. 6, the step Q4 is changed into the step Q3 at the period ②.

As described above, the multi-point control unit 10 adjusts the quantizing parameters so that the divisional picture including a hard moving object becomes coarse about picture quality and the divisional picture including a hardly moving object becomes fine about picture quality. Therefore, the multi-point control unit 10 suppresses the deterioration of the picture quality of the combined picture displayed on each of the videoconference terminals 12 in visual.

While this invention has thus far been described in conjunction with an embodiment thereof, it will be readily possible for those skilled in the art to put this invention into practice in various other manners.

For example, a moving vector, a flame thinning out direction or a combination thereof may be used for the decoding information signal in place of the invalid block number.

What is claimed is:

1. A multi-point control unit for use in a multi-point videoconference system having first through N-th (N≧3, N: integer) videoconference terminals connected to a network, said first through said N-th videoconference terminals transmitting first through N-th terminal picture data signals to said multi-point control unit, respectively, and receiving a combined picture data signal supplied from said multi-point control unit, each of said first through said N-th terminal picture data signals providing a predetermined picture size, said multi-point control unit comprising, a data exchanger connected to said network for receiving said first through said N-th terminal picture data signals through said network and for transmitting said combined picture data signal to said first through said N-th videoconference terminals through said network, first through N-th decoders connected to the data exchanger for decoding said first through said N-th terminal picture data signals, respectively, to produce both first through N-th decoded signals and first through N-th decoding information signals and for reducing the first through the N-th decoded signals to produce first through N-th divisional picture signals each of which provides 1/M (2≦M≦N, M: integer) of the predetermined picture size, a picture combining section connected to said first through said N-th decoders for selecting M from said first through said N-th divisional picture signals to produce a combined signal including the M of the divisional picture signals, an encoder connected to said picture combining section for encoding said combined signal to produce said combined picture data signal so that each of divisional picture signals included in said combined signal is encoded by the use of individual quantizing characteristic, and an encoding controller connected to said first through said N-th decoder and said encoder for producing a controlling signal in response to said first through said N-th decoding information signals and for supplying said controlling signal to said encoder to control said individual quantizing characteristic.

2. A multi-point control unit as claimed in claim 1, said encoding controller further connected to said picture combining section, wherein said picture combining section supplies a timing signal which is synchronous with a frame of the combined signal to said encoding controller to control operation timing of said encoding controller.

3. A multi-point control unit as claimed in claim 1, said encoder having a buffer memory for buffering said combined picture data signal, wherein said encoder decides the quantizing characteristic in response to quantity of the combined picture data signal memorized in said buffer memory.

4. A multi-point control unit as claimed in claim 1, wherein said encoder adjusts the quantizing characteristic coarse when the controlling signal is representative of the most conspicuous class.

5. A multi-point control unit as claimed in claim 1, wherein said encoder adjusts the quantizing characteristic into coarse when the controlling signal is representative of the most inconspicuous class.

6. A multi-point control unit as claimed in claim 1, wherein said first through said N-th decoding information signals are invalid block signals.

7. A multi-point control unit as claimed in claim 1, wherein said first through said N-th decoding information signals are moving vector signals.

8. A multi-point control unit as claimed in claim 1, wherein said first through said N-th decoding information signals are frame thinning out signals.

9. A method of encoding a combined picture signal including M (M≧2, M: integer) selected from first through N-th (N≧M, N: integer) divisional picture signals, said method comprising the steps of:

receiving first through N-th terminal picture data signals to produce first through N-th received signals, individually decoding said first through said N-th received signals to produce both first through N-th decoded signals and first through N-th decoding information signals, individually reducing said first through N-th decoded signals to produce first through N-th divisional picture signals, selecting M from said first through said N-th divisional picture signals to produce selected picture signals, combining the M of selected picture signals to produce the combined picture signal, individually classifying the selected picture signals into predetermined classes in response to said first through N-th decoding information signals, respectively, and encoding said combined picture signal so that each of divisional picture signals included in said combined picture signal is encoded by the use of individual quantizing characteristic with referring to predetermined classes.

10. A method as claimed in claim 9, the quantizing characteristic decided by quantity of encoded combined picture signal memorized in a buffer memory, wherein the quantizing characteristic is adjusted in response to said predetermined classes.

11. A method as claimed in claim 10, the quantizing characteristic is adjusted into coarse when each of the divisional picture signals belongs the most conspicuous class of said predetermined classes.

12. A method as claimed in claim 10, the quantizing characteristic is adjusted into fine when each of the divisional picture signals belongs the most conspicuous class of said predetermined classes.

* * * * *